(No Model.) 7 Sheets—Sheet 1.

W. H. PATTERSON.
MACHINE FOR MAKING PAPER BAGS.

No. 571,603. Patented Nov. 17, 1896.

WITNESSES
JAMES L. BUTLER.
John H. Thomas

INVENTOR
WILLIAM H. PATTERSON.
BY HIS ATTORNEYS
Humphrey & Humphrey (No Model.) 7 Sheets—Sheet 2.
W. H. PATTERSON.
MACHINE FOR MAKING PAPER BAGS.

No. 571,603. Patented Nov. 17, 1896.

WITNESSES
JAMES L. BUTLER.
John N. Thomas

INVENTOR
WILLIAM H. PATTERSON
BY HIS ATTORNEYS
Humphrey & Humphrey (No Model.) 7 Sheets—Sheet 3.
W. H. PATTERSON.
MACHINE FOR MAKING PAPER BAGS.
No. 571,603. Patented Nov. 17, 1896.
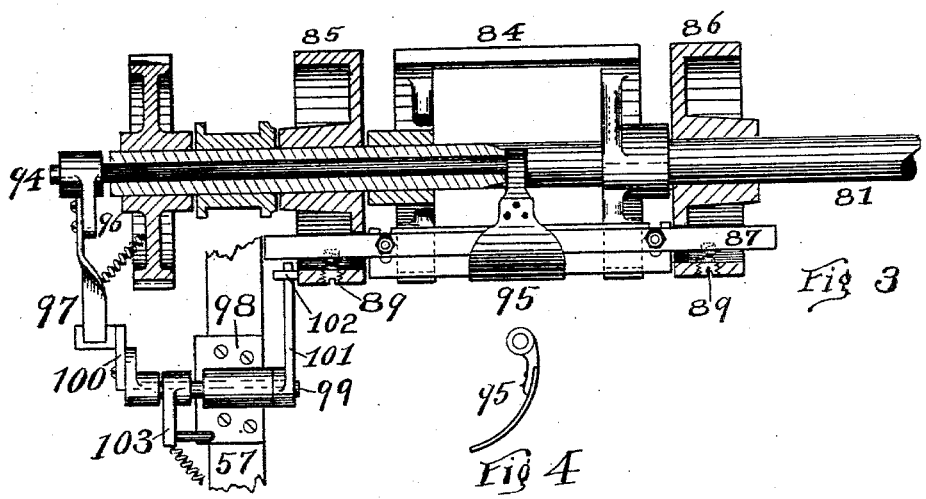
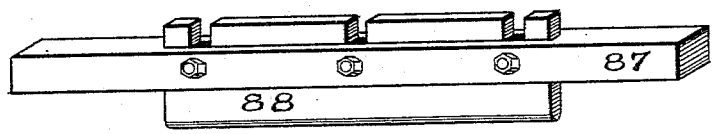
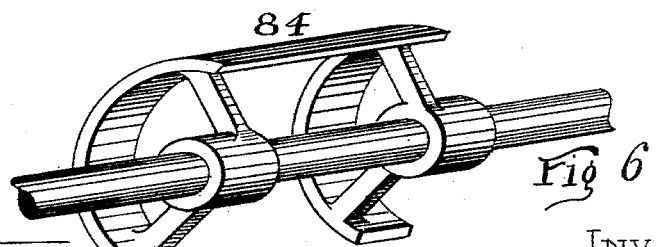
WITNESSES
James L. Butler.
John N. Thomas
INVENTOR
William H. Patterson
BY HIS ATTORNEYS
Humphrey & Humphrey.

(No Model.)

W. H. PATTERSON.
MACHINE FOR MAKING PAPER BAGS.

No. 571,603.

7 Sheets—Sheet 4.

Patented Nov. 17, 1896.

WITNESSES
JAMES L. BUTLER.
John H. Thomas

INVENTOR
WILLIAM H. PATTERSON.
BY HIS ATTORNEYS
Humphrey & Humphrey

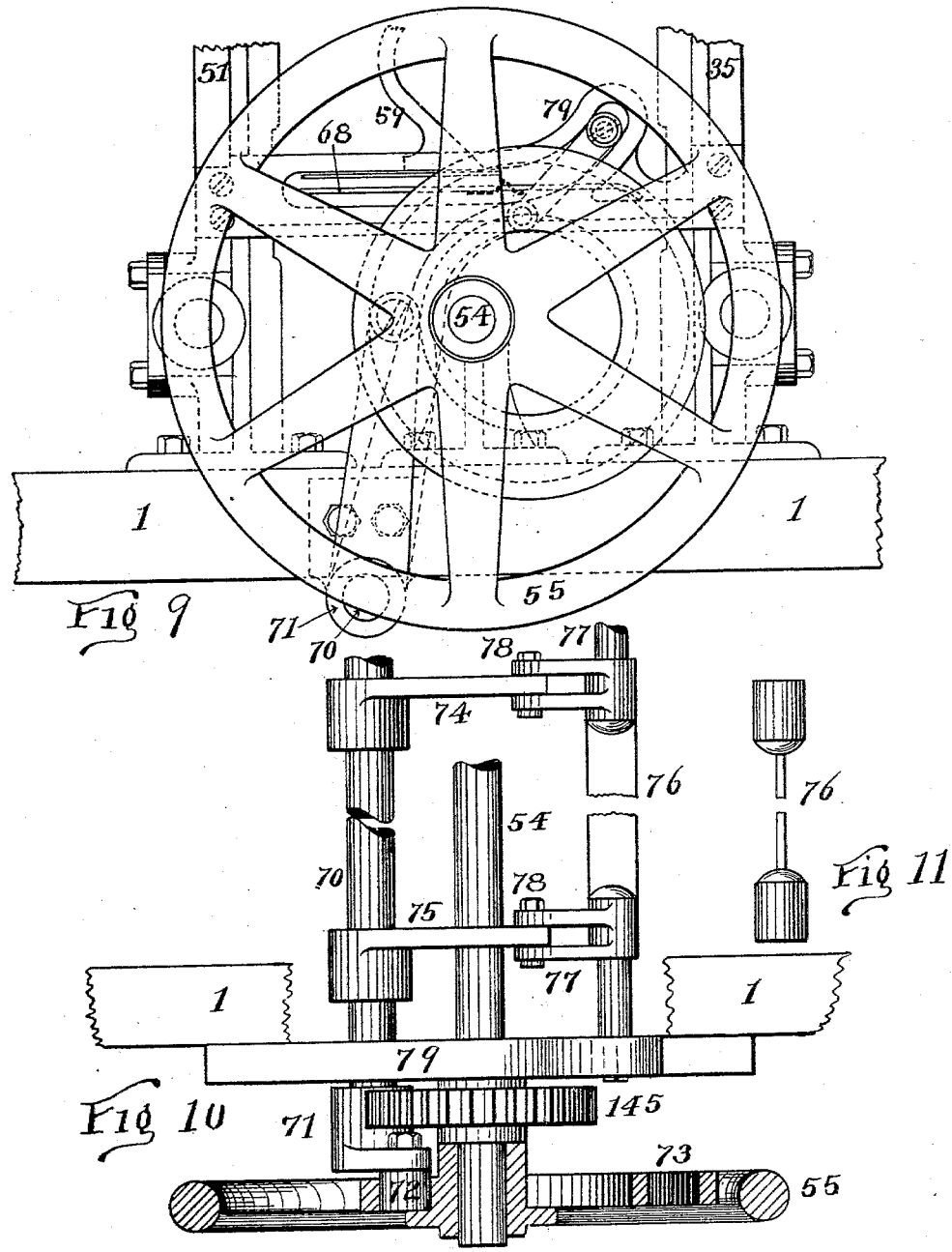

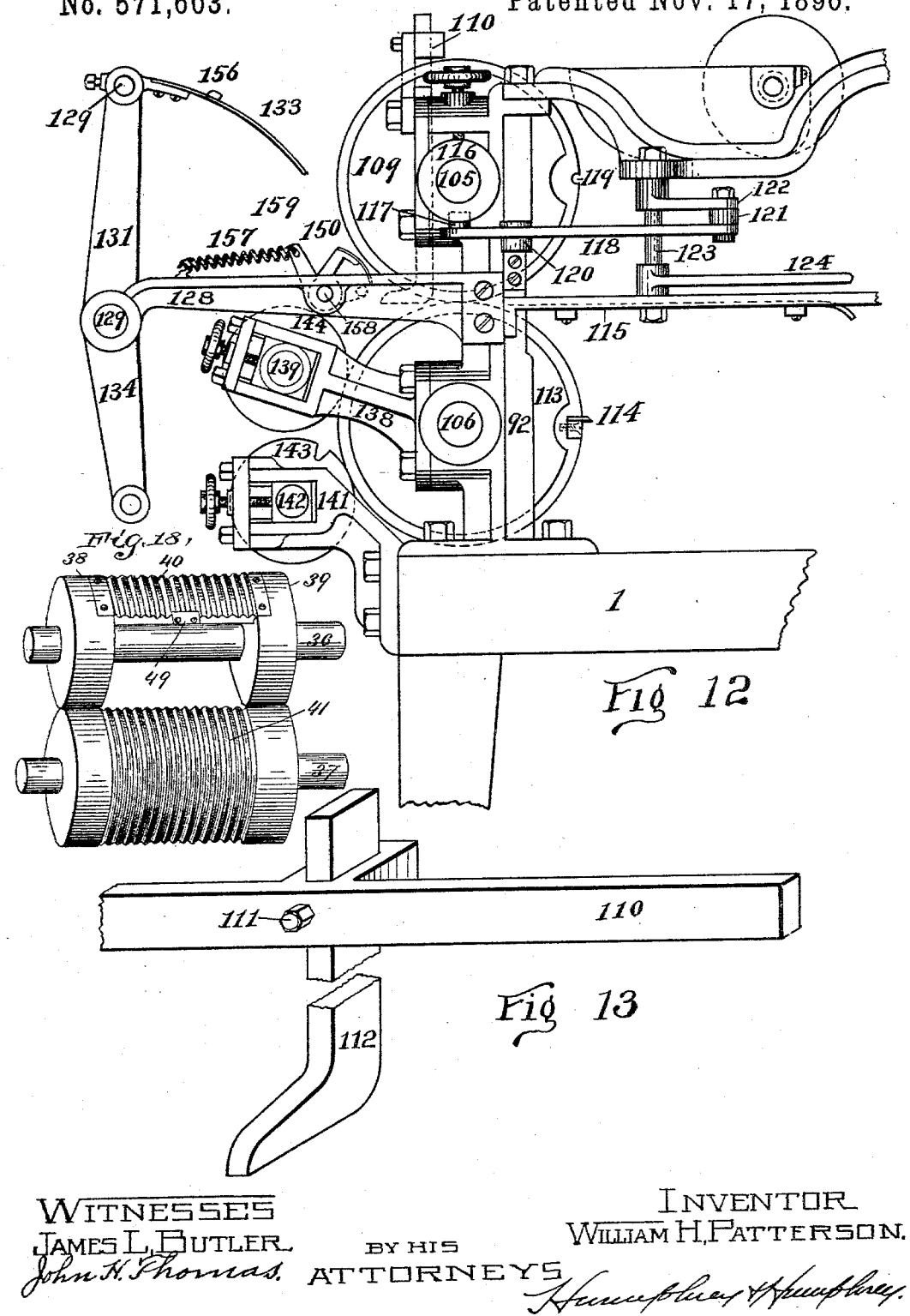

(No Model.) 7 Sheets—Sheet 7.
W. H. PATTERSON.
MACHINE FOR MAKING PAPER BAGS.
No. 571,603. Patented Nov. 17, 1896.
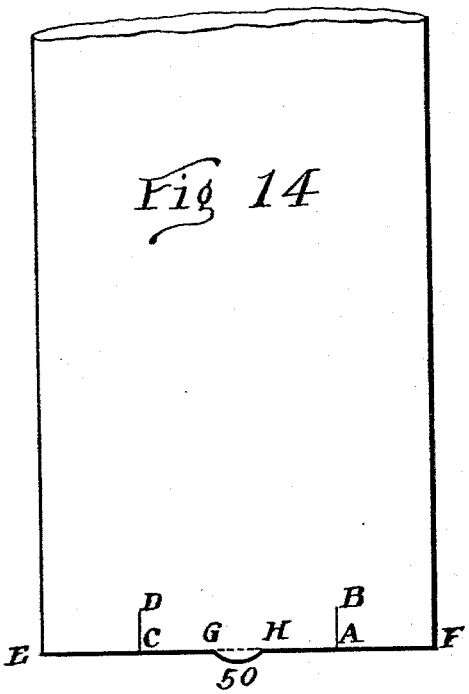
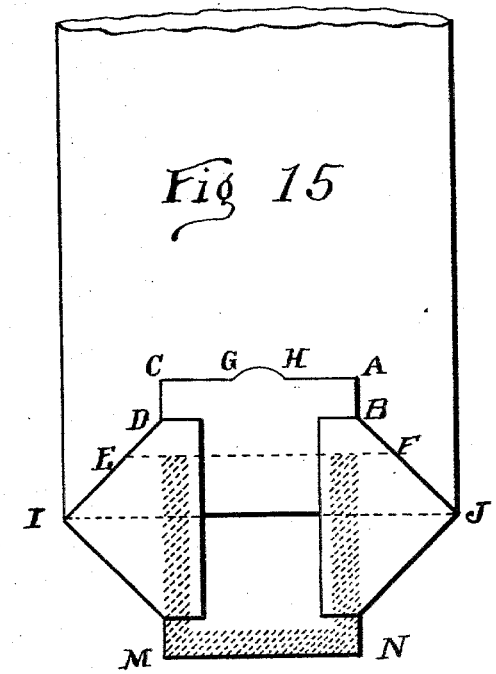
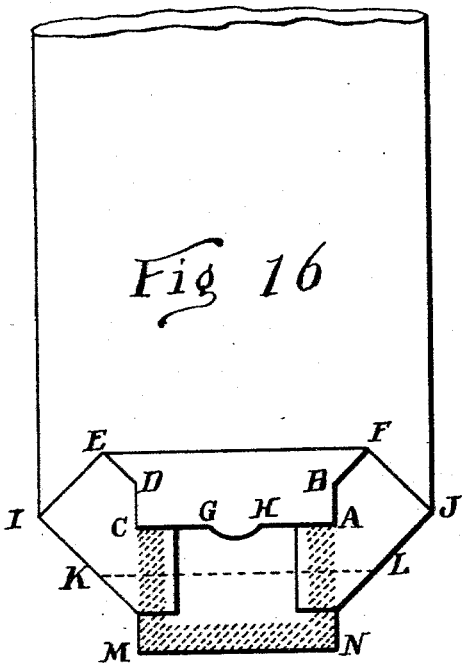
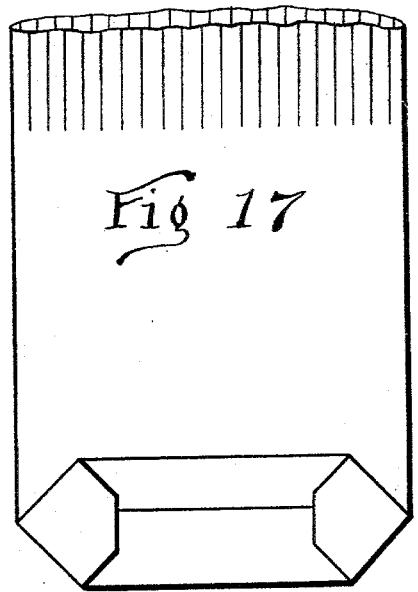
WITNESSES
James L. Butler.
John H. Thomas
INVENTOR
William H. Patterson
BY HIS ATTORNEYS
Humphrey & Humphrey
THE NORRIS PETERS CO., PHOTO-LITHO., WASHINGTON, D. C.

UNITED STATES PATENT OFFICE.

WILLIAM H. PATTERSON, OF CUYAHOGA FALLS, OHIO, ASSIGNOR TO HELEN PATTERSON, OF SAME PLACE.

MACHINE FOR MAKING PAPER BAGS.

SPECIFICATION forming part of Letters Patent No. 571,603, dated November 17, 1896.

Application filed December 17, 1895. Serial No. 572,448. (No model.)

*To all whom it may concern:*

Be it known that I, WILLIAM H. PATTERSON, a citizen of the United States, residing at Cuyahoga Falls, in the county of Summit and State of Ohio, have invented a certain new and useful Improvement in Machines for Making Paper Bags, of which the following is a specification.

My invention has relation to improvements in machines for the automatic manufacture of paper bags from a continuous paper tube, and especially relates to the formation of what is known as a "satchel" bottom thereon.

The object of my invention is to provide mechanism by which the successive steps necessary form the bottom on paper bags from a continuous tube of paper and conduct the same rapidly, automatically, and accurately.

To the aforesaid object my invention consists in the peculiar and novel construction, combination, and arrangement of the various parts hereinafter described, and then specifically claimed, reference being had to the accompanying drawings, forming a part of this specification.

Figure 1:
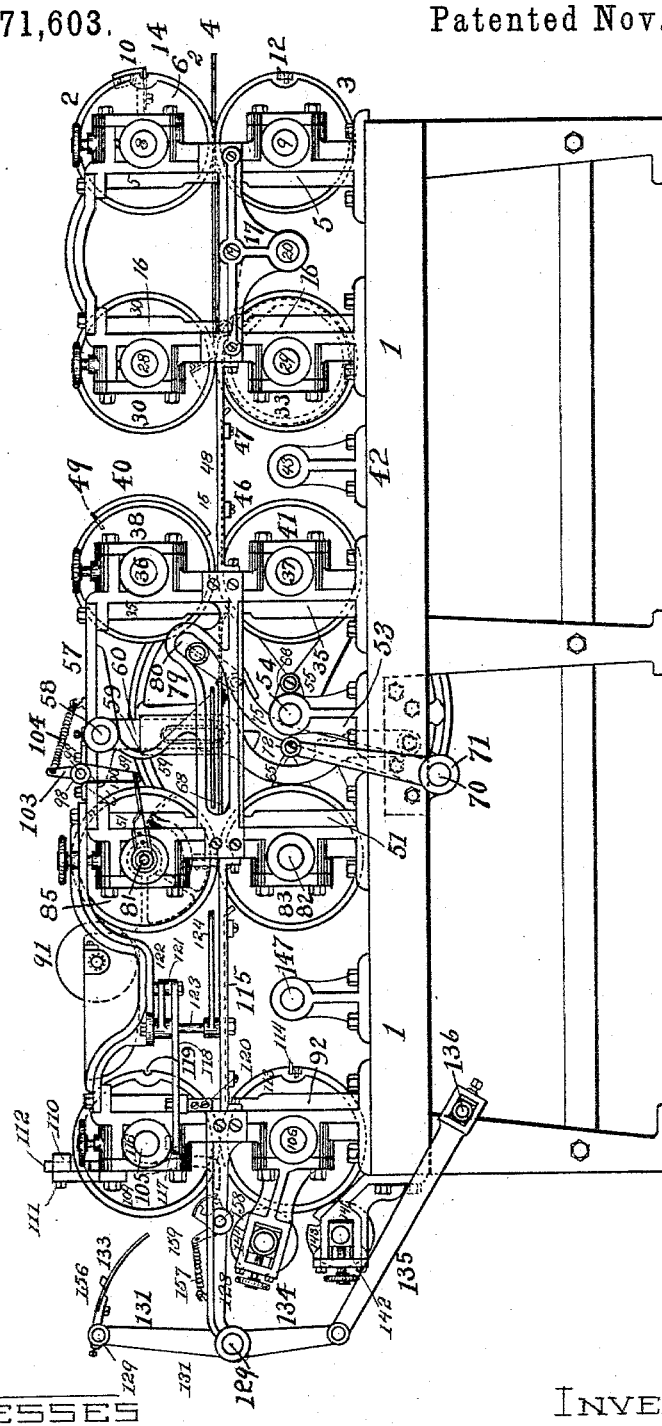
Figure 2:
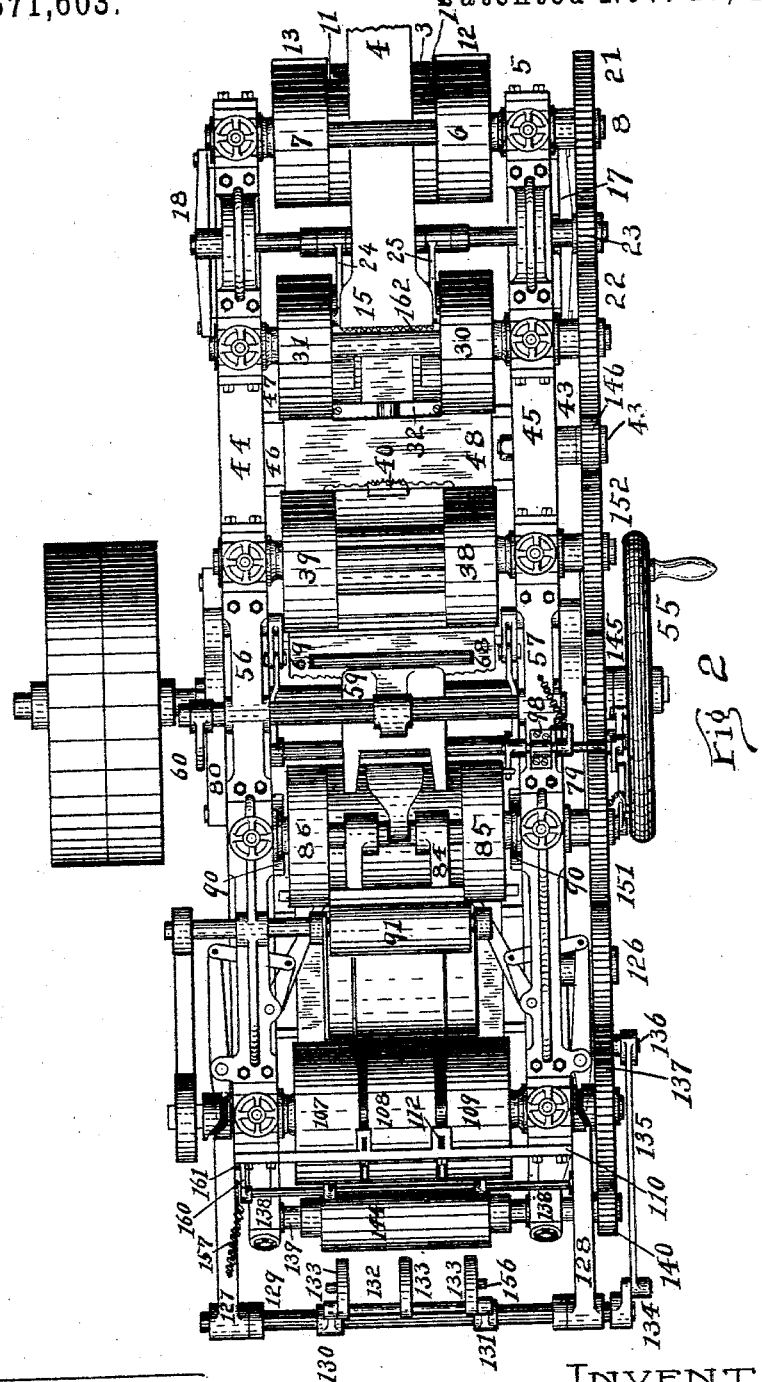
Figure 7:
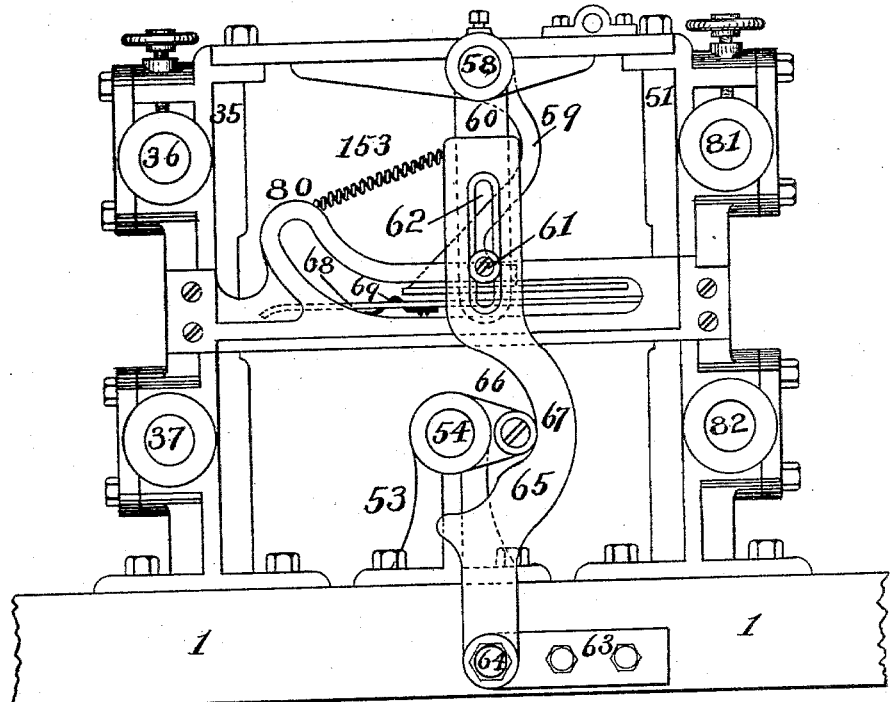
Figure 8:
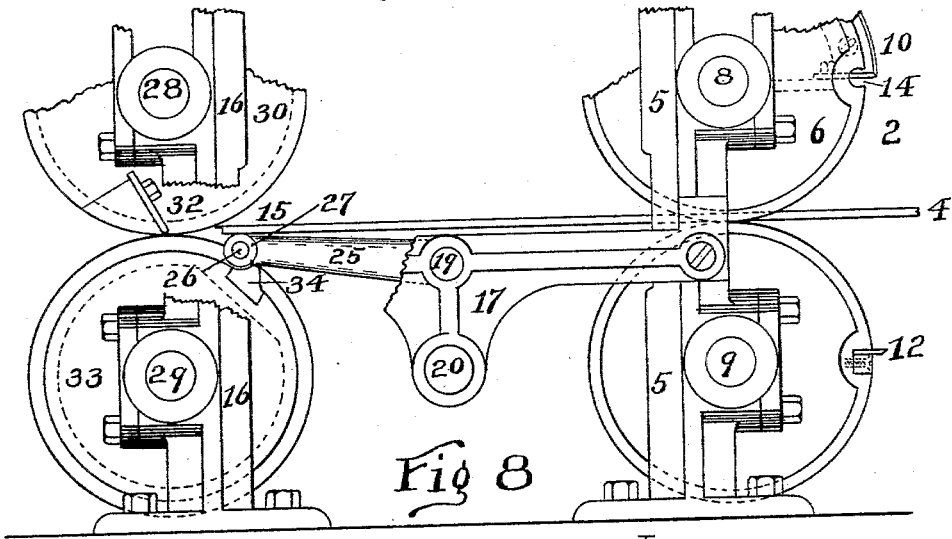

In the accompanying drawings, in which similar reference numerals and letters indicate like parts in the different figures, Figure 1 is a side elevation of the machine, with the gearing shown in Fig. 2 removed to better illustrate it. Fig. 2 is a plan view; Figs. 3, 4, and 5, details of the folding mechanism; Fig. 6, an enlarged view of the paster; Fig. 7, an enlarged view of mechanism for making the first fold, looking from the opposite side from Fig. 1; Fig. 8, an enlarged view of the mechanism for making a transverse cut across a portion of the tube; Fig. 9, an enlarged view of the same portion as Fig. 7 with additional mechanism and looking from the same direction as in Fig. 1; Fig. 10, a plan of a portion of the mechanism shown in Fig. 9; Fig. 11, a plan of the folder-knife; Fig. 12, a side elevation of the finishing end of the machine enlarged; Fig. 13, a perspective view of one of the guides for the bag indicated in Fig. 12; Figs. 14, 15, 16, and 17, details of the various cuts, folds, and creases in the bag in the process of manufacture and where the paste is applied. Fig. 18 is a detail of the longitudinal creasing-roller.

In the drawings, 1 is an elongated hollow skeleton-frame, of a desired material, upon which are mounted a number of housings in which the mechanism is supported and journaled. Looking at Fig. 1, the continuous paper tube (from any desired means of supply) enters the machine between rolls 2 and 3 and surrounding plate 4.

The roll 2 is mounted on shaft 8, which in turn is mounted in boxes in the housings 5 and is directly above roll 3, mounted on shaft 9, mounted in a manner similar to shaft 8.

The roll 2 consists of two narrow rolls 6 and 7, separated from each other. On the inner sides of rolls 6 and 7 and fastened thereto are two knives 10 and 11, concentric with the rolls, the size being dictated by the length of the desired cut.

The roll 3 is substantially a cylinder, and near its ends and transverse to the face thereof are two knives 12 and 13. The knives 10 and 11 have corresponding grooves in the roll 3 to receive them, and the knives 12 and 13 enter grooves 14 cut across the faces of rolls 6 and 7. Now the paper tube, sliding on plate 4, enters between rolls 2 and 3 and receives the following cuts, (see Fig. 14:) The knives 10 and 11 make the cuts A B and C D, respectively, through both sides of the tube, and knives 12 and 13 make cuts A F and C E, respectively, and through both sides of the tube. This leaves the space A C of both sides of the tube intact.

The plate 4 consists of a long narrow part terminating in an enlarged head 15. This head is the same width as the inside diameter of the bag. On this enlarged head 15 the front edge is a serrated knife 161. The outer end of this plate is fastened to some support, as a bench or post, to steady it, (which is deemed unnecessary to show and is practically precluded by want of space,) and the tube is formed around it between its supporting-post and the machine. This plate rests on the roll 3 and is between the rolls 6 and 7.

A short distance from housing 5 is a housing 16, and extending between them on both sides are supporting-brackets 17 and 18, both bored to receive a rock-shaft 19, to be described, and bracket 17 also has a dependent arm bored to receive a stud 20, on which runs an idler 23, connecting gears 21 and 22 on shafts 9 and 29, respectively.

Extending between brackets 17 and 18 and journaled freely thereon is a rock-shaft 19, bearing two arms 24 and 25, connected together by a pin 26, on which is mounted a revoluble roller 27.

In the housing 16 are two sets of journal-boxes to receive shafts 28 and 29. On shaft 28 are two rolls 30 and 31, similar to rolls 6 and 7, excepting the circular knives 10 and 11 are omitted, and a knife 32, having a smooth dull edge, is fastened to their inner sides transverse to their faces and extending across the distance between them, so as to leave a small lip 50, and having a small curved part near its center on the upper half of the bag. Below these rolls is a roll 33, mounted on shaft 29. This roll 33 consists of two outer portions, corresponding to rolls 30 and 31, of greater diameter, the middle portion of which shows in dotted lines in Fig. 8. On the inner shoulder of the larger portions are two lugs or ridges 34. On this reduced part runs the roller 27, and of course is abruptly thrown upward as it encounters the lugs 34. The enlarged end 15, and the knife 161, of the plate 4, rest on the upper face of the roller 27 (see Fig. 8,) and as the roller 27 strikes the lugs, is lifted with it, until the ridge has passed. Just at the moment the lugs 34 meet the roller 27 the knife 32 is at the lowest part of its revolution and presses its smooth dull edge against the upper side of the paper tube from the point A to C, and at the same instant the end 15 of plate 4 is raised by the roller 27, stretching it tightly against the knife 161 and cutting it from point A to point C of the upper half of the bag only. The plate then drops to place and the tube passes on, fed by the rolls 30 and 31, pressing it against the larger portions of roller 33, with the portion A to C of the lower half still attached to the forwardly-moving tube. A short distance from housings 16 is a third set of housings 35, supporting journal-boxes for the two shafts 36 and 37, revolving therein. The upper shaft 36 bears two narrow rolls 38 and 39, similar to 30 and 31, between which rolls is a plate 40 in the form of an arc of a circle fastened to both rolls on their outer faces and provided on its outer surface with peripherical grooves or corrugations. At the forward end of this corrugated plate is a small dull knife-shaped plate 49, which presses down on the line G H, the result of which is that the lip 50 turns up nearly perpendicular to the remainder of the bag for a purpose to be stated.

On the shaft 37 is a roll 41, having on its outer surface corresponding corrugations to the ones on the arc 40. The object of these two rolls 38 and 41 is to impress longitudinal creases in the upper part of the bag at the opposite end from that on which the folding is done. This is to better facilitate the tying up of the mouth of the bag with a string, as it crushes together more closely. This creasing or fluting is done at the upper end of the bag just after the knife 32 on roller 34 has cut the next succeeding bag between the points A C.

On the frame between housings 16 and 35 is an upright bracket 42, bearing a pin 43, on which runs an idler 146 to connect gears 145 and 152. Extending between the housings 16 and 35 and bolted thereto are two arms 44 and 45, their upper surface being at the exact height of the meeting-point between rolls 38 and 41 and 30 and 33. Between these two arms extend two smaller supporting-straps 46 and 47, fastened thereto, and fastened upon the upper faces of which is a large smooth plate 48, extending nearly the entire distance from the outside of rolls 31 and 39 to nearly the outside of rolls 30 and 38 and nearly all the longitudinal distance, and at the end nearest housing 16 it terminates in a narrow tongue, which turns sharply downward, so that the bag coming from the rolls 30 and 33 rides upon, to, and along its upper face to encounter the operative action of rolls 38 and 41.

While passing along plate 4, the sides of the bag are separated by it, but on leaving the rolls 30 and 33 the sides are together and pass over the plate 48 together.

A short distance from housing 35 and mounted on the frame is a housing 51, and between them are a pair of upright brackets 52 and 53 on the frame and in which is journaled the main driving-shaft 54 of the machine, on one end of which is a pair of pulleys, one tight, the other loose. On the other end of this shaft is a hand-wheel 55.

Extending across between housings 35 and 51 are two arms 56 and 57, each bearing journal-boxes for a rock-shaft 58, freely revoluble therein. Tight on this shaft is suspended a rocking shoe 59, and similarly mounted on this shaft 58 is a rocking arm 60, having a roller 61 at its free end revolving on a pin fastened into a slot 62 to permit of its adjustment. This is actuated as follows: On the same side of the frame that the pulleys are on is bolted a plate 63, having a stud 64 projecting therefrom, on which is pivoted a rocking arm 65, having a curved middle portion and terminating in a slotted free end.

On the shaft 54, near the pulleys, is a short crank 66, having at the free end a revoluble roller 67 on a pin. The slotted upper part fits over the roller 61, and this roller travels in the slot. Now the crank 66 revolves with the shaft 54, and the roller 67 encounters the concave side of the curved part of arm 65, and throws the free arm to one side, thus by means of the roller 61, which of course will follow the slot and the arm 60 and shaft 58, will cause the shoe to rock back and forth for each revolution of the driving-shaft. Under this shoe 59 is a plate 68, mounted exactly as plate 48 is, (but on account of the number of lines it is deemed unwise to attempt to show its support.) This plate has its receiving end turned down to catch the incoming tube and assist its passage. A transverse slot is cut through this plate directly in front of the point of the shoe, and a spring 69, equal in width to the slot, is fastened on the under side of plate 68 back of the slot. From there it projects up through the slot and then turns downward under the opposite side from which it is fastened, making an abrupt ridge nearly the width of the plate. When the crank 66 has thrown the arm 65 its greatest distance, the point or toe of the shoe is drawn back of this ridge, and when released from the crank a spring 153 throws it forward far in advance of the ridge. The object of this is as follows: The tube of paper, coming forward on plate 68 from the rolls 38 41 and having only the portion A C uncut and the lip 50 upright, passes over the spring 69 down under the shoe 59, which is in the position indicated by Fig. 7, until the part of the bag bounded by letters B A C D comes with its upright lip 50, when, instead of following the remaining portion of the tube under the shoe 59, it rides up its front side, and at that moment the shoe 59, released by crank 67, rises forward, folding the bag into a position (indicated by Fig. 15) over a folding-knife, to be described, and before the shoe returns that portion will have been drawn forward by the balance of the advancing tube aided by the knife referred to. The mechanism operating the folding-knife is also situated between housings 35 and 51, and is as follows: Under the frame and fastened thereto is a pair of hangers (indicated by dotted lines in Fig. 9) supporting rock-shaft 70 on the end near the hand-wheel 55, and outside the frame is fastened a rocking arm 71. On the other end of this arm 71 is a stud bearing a roller 72, which runs in a groove 73 on the inner side of the hand-wheel, but eccentric thereto.

Within the frame 1 and mounted on shaft 70 are two more rocking arms 74 and 75, fast on the shaft and rocking in unison with arm 71. To the free ends of the arms 74 and 75 is attached the folding-knife 76, hereinbefore referred to, by means of a pair of fingers 77, through which pass bolts 78, which also pass through the ends of arms 74 and 75.

The outer ends of the knife 76 are cylindrical. Next to the cylindrical parts are enlarged portions to which the fingers 77 connect, while the center portion is a thin wide piece with rounded edges. The outer ends of knife 76 travel in a pair of slotted ways or guides 79 and 80, which are bolted to housings 35 and 51 and of such a height that the center of the slot is even with the top of the plate 68. The front ends of these guides incline upward at about forty-five degrees' angle. When the knife 76 is by the action of the rocking arms 74 and 75 thrown to the upper ends of the guides 79, the blade is nearly vertical, and as it descends the slope it turns to nearly horizontal and passes over the spring 69 under the upraised shoe 59, striking along the line I J of the bag and pushing it under the shoe, making the portion I D C A B J fold back smoothly, as shown in Fig. 15. Of course the portion D C A B being upon the front of the shoe and being still attached to the remaining portion of the tube and aided by its forward motion and the knife 76 to determine the fold-line, it folds back readily. The movement of the arm 71 as its roller follows the eccentric groove 73 through the shaft 70 rocks the arms 74 and 75 with the knife 76 back and forth along the guides 79.

In the housing 51 are journal-boxes for shafts 81 and 82. On shaft 82 is a cylindrical roller 83, having across the face a transverse groove, otherwise plain. On shaft 81 is what is known as a "paster" 84, which consists of two arcs of a circle parallel and connected by a transverse strap, all integral and of equal radius with roller 83. This is mounted tight on shaft 81. (See Figs. 3, 4, 5, and 6.) This paster receives paste from a roller 91, running on a paste-pot suspended between housing 51 and 92. This roller is run by a pulley on its shaft by a belt from a pulley on shaft 93. The paster, from its peculiar shape, applies paste as indicated by the shaded part in Fig. 15, and of all the mechanism in housing 51 this paster encounters the bag first, and only when it is finished does the rest of the mechanism operate. Mounted on this shaft on either side of this paster are two rollers 85 and 86 with open outer ends and with solid inner sides. Through the web connecting their faces to the hubs thereof are two slots with their long sides parallel to the radius of the rolls. Passing through these slots is a square bar 87, which is slotted vertically and centrally about three-quarters of its length and through which passes a vertical creaser or folding-knife 88, which is also slotted to permit it to be adjusted and is held in place by bolts passing through bar 87 and itself. In the faces of rolls 85 and 86 are adjusting-screws 89, which enter smooth holes in the bar 87 and encounter therein small coiled springs placed there to normally hold bar 87 toward the shaft 81. The outer ends of bar 87 project beyond the rolls 85 and 86 and run under a pair of projecting ridges 90 on the inside of the housing 51 and which are eccentric to the shaft 81 and whose greatest distance from this shaft is directly below its center. Thus as the creaser 88 is pointing down it is forced suddenly outside the periphery of the rolls 85 and 86 and enters the groove in roll 83 and makes the line E F, Fig. 15, across the paper and at the same time tilting the free end D C A B nearly vertical and which is folded forward by a means now to be described.

One-half of shaft 81 is hollow, and at its center is a slot nearly around its circumference opening into the longitudinal hollow. Within this shaft 81 is a smaller shaft 94, freely revoluble therein. Projecting from the slot in shaft 81 is a fan-shaped blade 95, which is tight on shaft 94 and which is permitted a certain amount of loose circular motion by reason of the slot in 81 being larger than the hub of the folder-blade 95.

On the outer end of the shaft 94 is a rock-arm 96, terminating in a bent flat spring 97, held normally in place by a spring 154, attached to the gear on shaft 81.

On the arm 57, connecting housings 35 and 51, is a box 98, in which rotates a short shaft 99, a rock-arm 100, which encounters and temporarily stops the motion of arm 96, and spring 97; also on this shaft is a trigger 101, which is operated by a pin 102 on the outer edge of the flange of roll 85. On shaft 99 is another arm 103 with a projecting pin to encounter the edge of the box 98 and act as a permanent stop against backward movement.

In order to hold the shaft 99 in such a position that the pin 102 will encounter the trigger 101, I use a spring 104 of some form to normally hold it in place. I prefer to use the form indicated in Figs. 1 and 3, which show a coiled spring 104, fastened to an arm 103 on shaft 99 and with its other end connected to the frame.

The operation of the mechanism just described is as follows: The paster having applied the paste as described, the end of the paper tube is in the condition shown in Fig. 15, and as the paster leaves the paper the knife 58 is pressed down by the eccentric ridges 90 and strikes the tube at the line E F, Fig. 15, and creases it by pressing it into the groove in roll 83, causing the end bounded by lines E D C A B F to stand nearly vertical. Then the pin 102 encounters trigger 101, and through the shaft 99 and arm 100 releases the spring 97, allowing the blade 95 to jump suddenly forward (being perfectly free in between the sides of the paster and having, as described, a certain freedom of motion permitted by the size of the slot in shaft 81) much more rapidly than the speed of the shaft 81, and strikes the uplifted portion or flap (E D C A B F) just above where the creaser marked it, and passing on turns this portion, bending on the line E F down (see Fig. 16) upon the pasted portion, there to remain till the next step. The spring 104 instantly draws the trigger 101 back ready for the next bag. A short distance from housings 51 and similarly mounted on the frame is another set of housings 92, having boxes for a pair of shafts 105 and 106 vertically in alinement and parallel to each other, like those already described. On shaft 105 are three narrow rolls 107 108 109, slightly separated from each other, and across the faces of these rolls is a groove 119; otherwise these rolls are plain. Across between the two sides of housing 92 is a bar 110, having vertical slots in it provided with set-screws 111. These slots are directly over the spaces between rolls 107 and 108 and between 108 and 109, and this bar is to one side of the center of the rolls. In these slots are held (by the set-screws 111) a pair of vertical bars 112 with horizontal feet. These are so located that the bottoms of the feet are slightly below the union-line between the upper rolls 107 108 109 and the roll 113 on the shaft 106. The object of these bars 112 is this: The rolls 107 108 109 run over the paste on the bag, which is in the position shown in Fig. 16, and if the bars were not there the bag would in all probability follow around with the rolls 107 108 109. On the shaft 106 is a cylindrical roll 113, having a transverse groove across its face, in the transverse center of which is a knife 114, which is slightly wider than the space M N of the bag, Fig. 16. This knife enters groove 119 and at the same time cuts along the line M N, thus entirely separating this particular bag from the preceding one. This cutting of the last strip M N, which connects the series of unfinished bags passing through the machine, renders the use of bars 112 absolutely necessary. Under the paste-pot, suspended between housings 92 and 51, is a table-plate 115, supported in exactly a similar manner to plates 48 and 68, (a further description of which is believed unnecessary,) across the top of which passes the bag after leaving the folder 95, and, as this folder does not press the portion E D C A B F firmly down, but only gives it a sudden slap down upon the pasted portion, I find it necessary to provide a method of retaining it there during its transit across the plate 115. On shaft 105 at both ends outside of the frame 1, but within the gear on one side and the pulley on the other, are two cams 116, having irregular grooves therein in which run rollers 117 on pins, Fig. 12, on rocking arms 118, which are pivoted on short studs 121, attached to the housings 92. The other ends of arms 118 are pivotally fastened to connecting-bars 121, and similarly attached to these bars are rocking arms 122, tight on shafts 123, pivoted at one end in a cross-arm which sustains the plate 115 and at the upper end and parallel to the cross-arms between the same sets of housings. Just above the plate 115 are arms 124, tight on shafts 123. These are normally parallel to the cross-arms supporting the plate 115 and rest closely above it, but when at the instant the front of the bag end leaves the folder 95 the arms 124, actuated by the cams 155, throw the free ends of arms 124 inward simultaneously just over the center of the folded part E D C A B F, as shown in Fig. 16, but does not touch it, remaining just above it, preventing its springing upward until it passes between rolls 107, 108, 109, and 113, where it is held. As the cams 116 turn, the grooves change and throw back the arms 118, thus swinging the arms 124 back to their normal positions. Under the plate 115 is an upright bracket to hold a stud 125 for an idler 126 to complete the chain of gears, to be described.

Projecting horizontally from housings 92 are two stationary arms 127 128, terminating in journals for a transverse horizontal shaft 129, revoluble therein. Tight on this shaft are two rocking arms 130 131, their ends being connected by a rod 132, bearing a folder made of three blades 133, having thereon lugs 156, to be described. Hung below the shaft 129, outside of arm 128, is a crank 134, tight on this shaft, to which is pivotally fastened a connecting-rod 135 on a stud 136 on the outside of gear 137 on shaft 106 and by which motion is obtained for the folder 133. Projecting from housings 92, under the arms 127 and 128, are two hangers 138 with boxes at their outer ends for a shaft 139, bearing a cylindrical roll 144 with a smooth face running against roll 113. The shaft 139 has a pinion on it 140, meshing into gear 137 on shaft 106. Below the hangers 138 are two brackets 141 with boxes for a shaft 142, on which is a roll 143, having a transverse groove across it. The shaft 142 has a pinion on its nearer end also running in gear 137 on shaft 106, so that the rolls 113, 144, and 143 all run in the same direction. Mounted in brackets 127 and 128 is a rock-shaft 158, bearing two short crank-arms, terminating in curved blades 150, like blades 133, only much smaller. Connecting the ends of blades 150 is a transverse strap; also tight on shaft 158 are two rocking arms 159 and 160. A spring 157, attached to arm 159 and to bracket 127, serves to hold up the blades 150, and on arm 160 is a pin 161 to strike against the under side of the bracket and prevent the blades 150 being drawn too far by the spring 157.

The means for operating the folder-blades 150 is as follows: On blades 133 are lugs 156, which as blades 133 descend encounter the upper or back part of blades 150, driving them down with themselves, where they remain till blades 133 rise for the next stroke.

The reason for the folder-blades 150 in addition to 133 is this: The flap E D C A B F is folded down by rolls 83 and 85 and pasted by paster 84. The green paste, even after running between rolls 107, 108, 109, and 113, does not always serve to keep the corners C and A down flat, so that the other flap K M N L will fold over it. Consequently I use folder 150, which holds the corners C and A flat while the blades 133 are creasing the line K L. The operation of the folder and these last-described rolls is as follows: As the detached bag leaves the rolls 107, 108, 109, and 113 it is in the condition shown in Fig. 16. As it leaves these rolls the folder 133 descends and strikes the horizontally-moving bag at line K L, Fig. 16, thereby folding the part K M N L back onto the already-folded part, covering the line C G H A and parts of lines C D and A B and driving it vertically downward between the rolls 144 and 113, where it is pressed to place, and in this operation it is assisted by the folder 150, whose purpose has already been described. After leaving the rolls 144 and 113 it has a tendency to swing outward. So I have cut the groove in the face of roll 143, into which it enters, and as the roll 143 revolves it is caught between it and roll 113 and further pressed, dropping to a receptacle placed below the touching-point of rolls 113 and 143 a completed bag, as shown in Fig. 17.

In these machines all boxes are shown, but not figured or numbered, and nearly all have a take-up wheel or compensating device, which is not spoken of, as neither the boxes nor wheels form any element in my invention, and any preferred form may be used.

The chain of gears is as follows: Power coming to the driving-shaft 54 by the tight pulleys, the pinion 145 runs into gears 151 and 152 on shafts 82 and 37, respectively. All the gears on the lower tier of shafts run into the corresponding gear on the upper shaft. Thus the gear on 37 runs into the gear on 36; also the gear on 37 runs into the idler 146 on stud 43, which in turn runs into gear on shaft 29, that runs into idler 23 on stud 20, which meshes into gear 21 on shaft 8. Going the other way, pinion 145 runs into a gear on shaft 82, that meshes with an idler 126 on stud 147, which drives the gear 137 on shaft 106, which drives the gear 140 and the gear on shaft 142.

What I claim is—

1. In a machine of the class designated, the combination of a pair of housings, 5 and 16, bearing a pair of rolls each, of a pair of brackets, 17, connecting said housings, a shaft 19 journaled in said brackets, a roller 27 on a pin 26, extending between two arms, 24 and 25, on said shaft 19, of a pair of rolls, 30 and 33, said roll 30 consisting of a pair of narrow rolls 30 and 31, of a dull knife 32, extending between them, a roll 33 having a reduced middle portion, on which said roller 27 runs, and provided with lugs, 34, on the inner sides of the enlarged heads thereof, a guide-board 4, having a knife, 162, with sharp teeth along its edge, across its inner end, and adapted to rest on roller 27 and be raised by it, substantially as shown and for the purpose set forth.

2. In a machine of the class designated, having a main driving-shaft 54, provided with tight and loose pulleys, a crank-arm, 66, a roller 67 on the end thereof, a curved slotted arm 65, pivoted on the frame, a shoe 59 on a shaft 58, pivoted in brackets on housings 35 and 51 of said machine, a rock-shaft 60, having a roller 61 thereon, running in the slotted opening in said curved arm 65, said crank 66 adapted to revolve with said shaft 55, and encounter the curved portion of said arm, and actuate said shoe forward and back, by means of said roller 61, arm 60 and shaft 58, in combination with a plate, 68, sustained under said shoe, and a spring, 69, projecting through said plate in front of the point of said shoe, substantialy as shown and described.

3. In a machine of the class designated, the combination of a shaft, 81, mounted in housings in said machine, and hollow one-half of its length, and having a slotted opening connecting with said hollow part, a folder-blade, 95, hinged in said slotted hole, a secondary shaft, 94, within said hollow post, and forming the support for blade, 95, a spring-finger, 97, attached to said shaft, 94, and a stop, 100, on a shaft, 99, mounted in the frame of the machine, a trigger, 101, on said shaft, 99, and a roll, 85, and a pin, 102, projecting therefrom and arranged to encounter said trigger and release said spring 97, and permit the free movement of shaft 94 and blade 95, substantially as shown and described.

4. In a machine of the class designated, the combination of a shaft, 81, mounted in housings in said machine, a pair of narrow rolls, 85 and 86, mounted thereon, each having a radial slot in the inner faces, a slotted bar, 87, arranged to pass through said slots in said rolls, an adjustable creaser-knife, 88, fastened in the slot in said bar, and two circular ridges, 90, on the inner sides of said housings and partially surrounding and eccentric to the journals of said shaft, 81, arranged to encounter the upper face of the bar 87, at its outer ends and depress said creaser-knife during the passage of said bar under said ridges, substantially as shown and described.

5. In a machine of the class designated, the combination of two sets of housings, 51 and 92, a plate 115, suspended between said housing and over which the bag passes, a shaft, 105, journaled in said housings, 92, a grooved cam 116 on said shaft, a rocking arm 118 pivotally mounted in said machine, a connecting-link 121, attached to said arm 118, and a crank 122 attached to said link and mounted on a vertical shaft, 123, and an arm, 124, mounted on said vertical shaft and having a free end adapted to be swung inward over the face of the table, 115, and back by the movement of the roller in said grooved cam, substantially as shown and described.

6. In a machine of the class designated, the combination of a pair of brackets, as 127 and 128, a horizontal shaft, 129, journaled therein, a series of folder-blades, 133, mounted thereon, a crank, 134, and connecting-rod, 135, operating said shaft, and a second folder, 150, mounted on a separate shaft journaled in said brackets, and arranged to be actuated by the descent of said folders 133, and to be returned to its normal position by a spring, substantially as shown and described.

In testimony that I claim the above I hereunto set my hand.

WILLIAM H. PATTERSON.

In presence of—
C. E. HUMPHREY,
JOHN H. THOMAS.